(No Model.)
E. B. TAYLOR.
VEHICLE DEVICE FOR CHECKING HORSES.
No. 313,897. Patented Mar. 17, 1885.
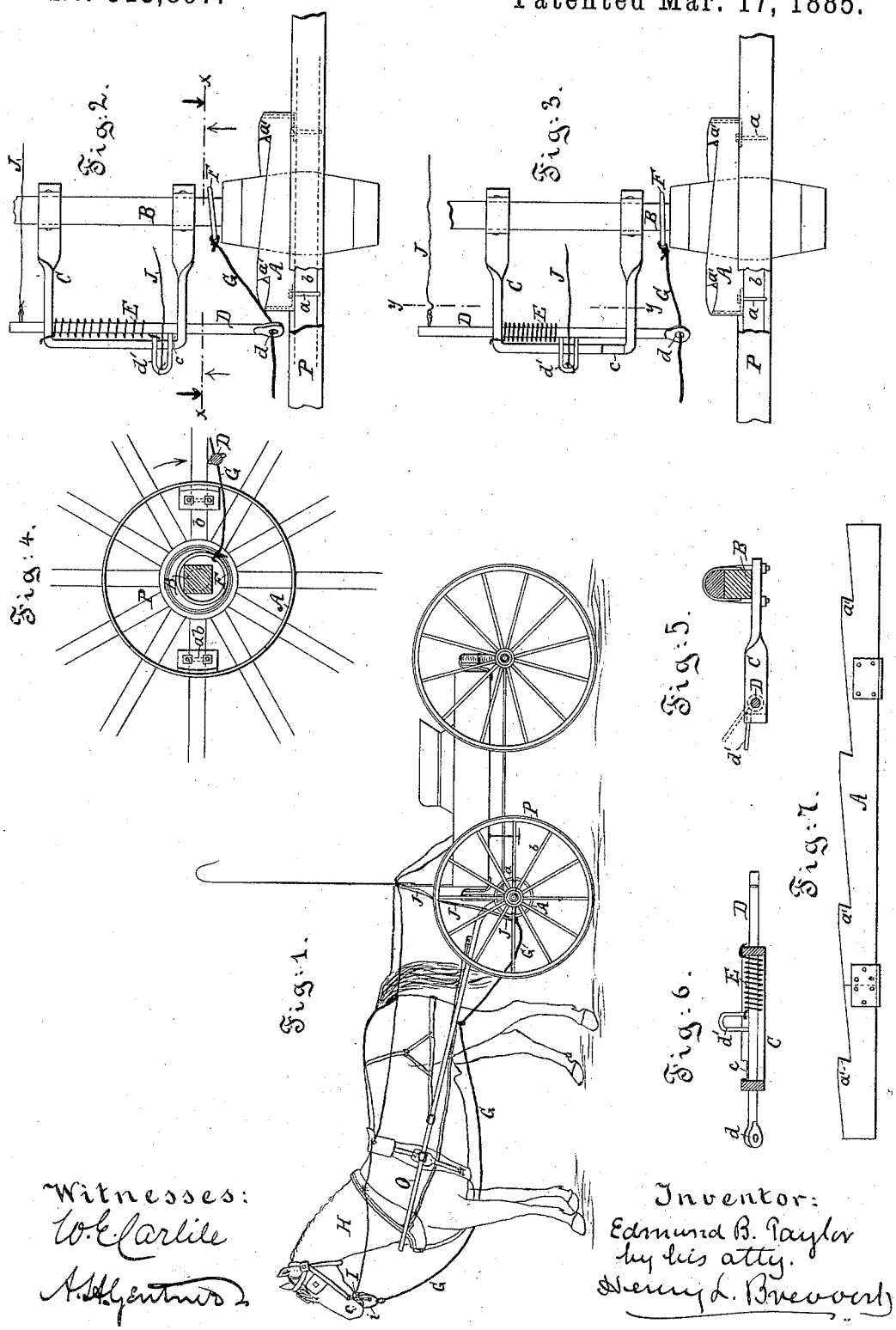
Witnesses:
W. E. Carlile
A. H. Gentner
Inventor:
Edmund B. Taylor
by his atty.
Henry L. Brevoort

UNITED STATES PATENT OFFICE.

EDMUND B. TAYLOR, OF COLLEGE HILL, MASSACHUSETTS.

VEHICLE DEVICE FOR CHECKING HORSES.

SPECIFICATION forming part of Letters Patent No. 313,897, dated March 17, 1885.

Application filed December 24, 1884. (No model.)

*To all whom it may concern:*

Be it known that I, EDMUND B. TAYLOR, of College Hill, in the town of Medford, county of Middlesex, and State of Massachusetts, have invented a new and useful Vehicle Device for Checking Horses; and I do hereby declare that the following, when taken in connection with the accompanying drawings, is such a full and accurate description thereof as will enable others to practice my invention.

My invention relates to devices whereby a horse attached to a vehicle can be brought to rest if he attempts to move the vehicle forward when the device is in operation.

My invention consists more particularly of a check-line or other flexible connector leading from the bit of the horse back to the axle of the wagon, upon which it is held and secured in such a manner that it may rotate thereon by a loosely-fitting ring, the said line or flexible connector at a point adjacent to the axle being under the control of a shifting mechanism, preferably attached to the axle, by means of which the line or flexible connector may have its position regulated and controlled in reference to a rotating engaging device, preferably fastened to the spokes of the wheel of the vehicle, said engaging device being constructed with teeth in such a manner that when the shifting mechanism moves the line or flexible connector into one of its two positions the catch device will be inoperative, so far as its action upon the line is concerned, while when the shifting device moves the line into the other of its two positions the forward rotation of the wheel and catch device will cause the teeth of the catch mechanism to engage with the line and wind it upon the exterior surface of the catch device, thus shortening the line and bringing the horse to a standstill and preventing him from walking off with the wagon, the device being so arranged and constructed that when the horse backs the line is again lengthened.

Referring to the accompanying drawings, Figure 1 is a side view of a wagon provided with my invention and with a horse attached. Fig. 2 is a plan view of my newly-invented mechanism attached to the front axle and left front wheel of a wagon. This figure shows the mechanism in position to arrest the horse. Fig. 3 is a corresponding view with the parts in position to allow the horse to move. Fig. 4 is a section on the line $x\,x$, Fig. 2, looking in the direction of the heavy arrows. Fig. 5 is a section on the line $x\,x$, looking in the direction of the light arrows. Fig. 6 is a section on the line $y\,y$, Fig. 3; and Fig. 7 shows the catch device cut open and developed into a plane.

At Fig. 1 is shown a side view of a wagon. At O are the shafts, and at P are the front wheels. H is the horse. One of the wheels P has attached to it the catch device A, (shown also in Figs. 2, 3, 4, and 7,) the said catch device being fastened to the wheel P by means of the staples $a$, which surround two or more of the spokes, $b$, of the wheel.

At B is shown the axle, upon which is bolted or otherwise fastened the line-shifting mechanism. This may consist of a frame, C, carrying a sliding rod, D, having an eye, $d$, in one end of it, and a contractile spring, E, which causes the shifting-rod D, when freed, to occupy one of the two positions intended for the shifting mechanism to stand in. A catch, $d'$, is arranged in connection with the shifting-rod D, and a notch, $c$, is formed in the frame C, so that the shifting mechanism may be caused to occupy the other position which it is intended to have. Of course, when the catch $d'$ is freed from the notch $c$ in the frame C, the spring E will carry this shifting mechanism automatically into such one of the two positions of the shifting mechanism as it is desired that the spring shall automatically move the shifting mechanism. One end of the shifting-rod D is provided with an eye or other form of device adapted to control the position of the line. This eye is shown at $d$.

On the axle B is a ring, F, which preferably has but slight lateral motion on the axle, but is free to revolve thereon. Attached to this ring is the inner end of the line or flexible connector G. This line, after it leaves the ring, passes through the eye $d$ of the shifting-rod, and from thence it may run, preferably, as shown, to the horse's bit I, being attached thereto by means of a strap, $i$, which takes hold of both sides of the bit.

At J is shown the operating-cord, which, when pulled in one direction, moves the shifting-rod D against the action of the spring E until the catch $d'$ falls behind the shoulder of the notch $c$, and which cord, when pulled by its other end in the proper direction, frees the catch $d'$ from the notch $c$, and allows the spring to move the shifting-rod into its other position. It will be seen that when the eye of the shifting-rod is in the position shown in Fig. 2 it carries the line G into such a position that the teeth $a'$ of the rotating catch device A will, on the forward motion of the vehicle, catch the line G and wind it upon the exterior surface of the catch device, thus shortening the line and checking the horse, while when the shifting mechanism is in the position shown in Fig. 3 it will be seen that the line is by the shifting mechanism held away from and out of engagement with the teeth of the catch mechanism.

The operation of the device is simple. When the driver desires to leave the horse and wagon, he, by means of the cord J, moves the shifting mechanism into the position shown in Fig. 2. Then if the horse attempts to move forward he will be checked gradually by the shortening of the line G, which will be wound upon the catch mechanism. When the driver returns, by means of the cord J and the spring E, he causes the shifting mechanism to move into the position shown in Fig. 3, when the horse can be driven forward, the line being held clear of the catch mechanism. The teeth $a'$ of the catch mechanism are preferably formed as shown, being beveled on one side, so that even if the line is, by the shifting mechanism, held in the engaging position, the backing of the horse will not effect a shortening of the line. The line is connected, preferably, with the ring F upon the axle, so that when the line is shortened by being wound upon the catch mechanism it will wind alone upon such mechanism and will not wind around the axle.

I believe it to be broadly new to combine a catch or shortening mechanism so that the shifting mechanism can be adjusted so as to hold the line in such position that it will engage with or be free from the catch mechanism.

I am aware that there are very many old devices for accomplishing the same purpose that I propose to effect; but in these old devices, or rather in most of them, the line has been attached to some mechanism which was itself revolved and moved into and out of engagement with a rotating part of the wagon.

In no previous example have I found a shifting mechanism which controlled the position of the line in relation to a mechanism adapted by the forward movement of the wagon to shorten the line.

My device is simple, it is cheap, and it can be applied to any wagon readily and in a very short time. It can be adapted for a two-horse vehicle, in which case the line G can be led along the pole; or my device can be duplicated and used on each end of the axle.

The line G might not extend to the horse's bit, but might be arranged to connect in some convenient way with the driving-reins, which would then form a portion of the line or flexible connector.

The line and the cord J can be carried by various routes to their desired destinations, this being no part of my invention; likewise, a lever in certain modifications could be used in place of the cord J.

The shifting mechanism can be made in various ways. For example, a lever can be used, one end of which is to be operated by the driver, and the other end of which could be formed into an eye for controlling the line G, a proper catch device being used to hold the lever in either of the two positions in which it may be desired to adjust it.

What I claim, and desire to secure by Letters Patent, is—

1. The combination, with the wheel of a vehicle, of a connected winding device provided with line-engaging portions and a line and line-controlling mechanism, whereby the line is held in and out of engagement with the winding device, substantially as described.

2. The combination, with the wheel of a vehicle and a winding device attached thereto, provided with teeth, substantially as shown, of a line and line-controlling mechanism which may be moved and held in one of two positions, so that the line may be caused to shorten when the vehicle advances, or may be held away from the shortening mechanism and be unaltered in length when the vehicle moves, substantially as described.

3. A shifting mechanism adapted to control and hold a line in one of two positions, consisting of the combination of a stationary frame and shifting-rod adapted to control the said line, substantially as described.

4. The combination, with a stationary frame, of a spring-actuated shifting-rod and a catch device adapted to control the position of the said rod, and a line controlled by said shifting-rod in relation to a winding device, substantially as described.

5. The combination of a winding device provided with engaging teeth and a line attached at its rear end to the axle in such manner that the line will not wind thereon, and which line at the other end forms connection with the horse's bit, substantially as described.

6. The combination of a frame, a shifting-rod, a spring and catch, and means for moving the shifting-rod, so that the catch may be brought into action to hold the shifting-rod in one position, while the spring may be used to hold it in the other position, substantially as described.

7. The combination of a winding device, provided with teeth adapted to catch upon a line and shorten the same when the vehicle advances by winding the line upon the exterior surface of the said device, and a line which may be held so as to be engaged by or be free from the said teeth, substantially as described.

8. A winding device adapted to be attached to the wheel of a vehicle, having an exterior surface adapted to hold a line when wound thereon, and teeth which on one face are adapted to catch the line and on the other face are beveled, so that the line can slip past the teeth, substantially as described.

9. The combination of a catch or winding device attached to a wheel of a vehicle, provided with teeth, as shown, which will hold a line when rotated in one direction, but will not hold it when rotated in the opposite direction, a line one end of which leads to the horse's bit, and the other end of which is so attached to the axle that it will not wind thereon, and a shifting mechanism consisting of a stationary frame and a shifting-rod, which latter controls the position of the line with regard to the winding device, substantially as described.

10. A winding device attached to a vehicle-wheel by clips which embrace the spokes of the wheel, said device being provided with teeth to engage with a check-line, substantially as described, and a shifting mechanism adapted to control the position of the said line, said shifting mechanism being attached to the axle by means of clips, substantially as described.

11. The combination of a vehicle-wheel carrying an attached winding device, a shifting mechanism attached to the axle, and a line controlled thereby, one end of which is attached to a ring surrounding the axle between the hub and the shifting device, substantially as described.

12. The combination of the frame of the shifting mechanism, provided with a notch, as $c$, and a sliding rod moved in one way by a spring, as E, said rod carrying an arm, as $d'$, adapted to engage with the notch $c$, substantially as described.

13. A shifting-rod moving in a stationary frame, said rod being provided with an arm, as $d'$, which is adapted to have attached thereto the operating-cord leading to the driver, in combination with a line controlled by the position of the shifting-rod, substantially as described.

14. A line-shifting device consisting of a frame, as C, a shifting-rod, as D, provided with an eye, as $d$, and devices for holding the shifting-rod in one of two positions, in combination with a line passing through the eye, and a device adapted to shorten the said line, substantially as described.

EDMUND B. TAYLOR.

Witnesses:
GEO. M. AMERIGE,
SAMUEL P. ABBOTT.